United States Patent
Prix et al.

(12)

(10) Patent No.: US 6,495,214 B1
(45) Date of Patent: Dec. 17, 2002

(54) METHOD OF PRODUCING A FILM OR A LAYER WITH A SURFACE STRUCTURE ON BOTH SIDES

(75) Inventors: Volker Prix, Siegsdorf (DE); Reinhold Nentwich, Dießen (DE)

(73) Assignee: Emtec Magnetics GmbH, Ludwigshafen (DE)

( * ) Notice: Subject to any disclaimer, the term of this patent is extended or adjusted under 35 U.S.C. 154(b) by 0 days.

(21) Appl. No.: 09/423,878

(22) PCT Filed: Apr. 24, 1998

(86) PCT No.: PCT/EP98/02445

§ 371 (c)(1),
(2), (4) Date: Nov. 15, 1999

(87) PCT Pub. No.: WO98/52733

PCT Pub. Date: Nov. 26, 1998

(30) Foreign Application Priority Data

May 21, 1997 (DE) .......................... 197 21 170

(51) Int. Cl.$^7$ .............................. B05D 5/00; B05D 1/40
(52) U.S. Cl. .................. 427/510; 427/508; 427/521; 427/211; 427/278; 427/365; 427/428
(58) Field of Search ................. 427/211, 510, 427/521, 508, 365, 428, 278; 118/224, 227, 249

(56) References Cited

U.S. PATENT DOCUMENTS

| 3,241,429 A | 3/1966 | Rice et al. |
|---|---|---|
| 3,374,303 A | 3/1968 | Metz |
| 3,551,544 A | 12/1970 | Hlinka |
| 3,917,772 A | 11/1975 | Hollenbeck |
| 4,177,304 A | * 12/1979 | Berry .......................... 427/209 |
| 4,414,316 A | 11/1983 | Conley ........................ 430/496 |
| 4,420,502 A | 12/1983 | Conley |
| 4,615,090 A | 10/1986 | Baus .......................... 29/121.8 |
| 4,781,975 A | 11/1988 | Baus |
| 4,836,874 A | 6/1989 | Foster |
| 5,728,449 A | 3/1998 | Steininger et al. |

FOREIGN PATENT DOCUMENTS

| WO | 93/23244 | 11/1993 |
|---|---|---|
| WO | 94/01288 | 1/1994 |

OTHER PUBLICATIONS

Webster's Ninth New Collegiate Dictionary, Merriam–Webster Inc., 1990, pp. 992 and 1169.*

* cited by examiner

*Primary Examiner*—Katherine A. Bareford
(74) *Attorney, Agent, or Firm*—Keil & Weinkauf

(57) ABSTRACT

A method of and apparatus for producing a transparent film or a transparent layer with a surface structure at least on one side and, on the other side, in register with said surface structure, a structural or 2-dimensional pattern, operate with at least two rotating rollers and layer application between them and curing of a structural layer. By means of a third rotating application roller, a further layer can be applied in register to the rear side of the structural layer and can be cured. The rollers and roller nips can be set very accurately by suitable devices. The rotation of all the rollers is controlled by a master drive.

13 Claims, 8 Drawing Sheets

METHOD OF PRODUCING A FILM OR A LAYER WITH A SURFACE STRUCTURE ON BOTH SIDES

This is a 371 national stage application of PCT/EP 98/02445, filed on Apr. 24, 1998.

BACKGROUND OF THE INVENTION

The invention relates to a method of producing a film or a layer with a surface structure at least on one side of a base film and, on the other side, in register with said surface structure, a structural or two-dimensional pattern, which are produced by means of a first roller and a second roller, provided with a circumferential structure, the rollers being driven in approximately equally fast, but opposite rotation, and the film or the layer being produced by applying a layer of thermoplastic polymer to a film fed to the second roller via the first roller and by irradiating through the base film the polymer layer bearing against the circumference of the second roller in order to cure it, and also relates to a suitable apparatus for said method.

The applicant's EP-B 655 032 discloses how an anti-copy film is produced from transparent material and line- or strip-shaped screens in defined offset arrangement onto both surfaces of the film by printing and/or photographic technology by applying a photosensitive coating, in particular a photoresist coating, to one side of the film, exposing it to (UV) light through a mask and developing it and subsequently applying a further photosensitive coating to the other side of the film, exposing it to (U) light through a mask and developing it. A particularly good register of the line or strip screens is achieved in this case if the second photosensitive coating is exposed through the first, already developed coating.

U.S. Pat. No. 3,241,429 also discloses 3-dimensional panorama pictures which are provided with paper as the base film or directly comprise a layer of plastic lenses, an emulsion being printed either onto the paper or onto the rear side of the layer of lenses. To obtain register of the lenses with the print on the rear side, incisions or punched openings in the film are used, with the aid of which the printing operation takes place in register.

U.S. Pat. No. 4,420,502 disclose an apparatus for producing a film with a predetermined, finely defined surface structure on one side, a first, smooth-surfaced cylindrical roller and a second cylindrical roller with a structured circumference being driven and a flowable, uncured thermocurable resin material and a transparent film being introduced in to the nip between them, and a film or a layer with a defined structure being obtained on the film by subsequent UV curing. The UV curing takes place through the film directly on the second roller.

A single-layer structured film is obtained, which can be used in particular for the purpose of 3-D pictures and is also known from U.S. Pat. No. 4,414,316, a description of which follows. In it, a flexible, composite film with a lenticular surface comprises in a known way a base film and a transparent thermocurable layer, which has lenticular forms, the focusing plane of the lenticular forms lying substantially at the rear side of the base film. The thermocurable layer comprises a thermocurable polymer, which is cured by means of UV light. The known film is intended for producing 3-dimensional representations or photographs, in that the film is laminated onto stereographic printed images.

A film structured on one side is also known from WO 94/01288. In it, cylindrical lenses are provided on one side and screening strips may be produced on the rear side by printing, but without specifying how a fixed relative arrangement of the lenses with respect to the position of the screening strips is technically achieved. A film for anti-copying purposes cannot be produced on the basis of this document.

It is therefore an object of the present invention to specify methods and apparatuses which make it possible to produce economically films or layers structured in-register on two sides.

SUMMARY OF THE INVENTION

The features of the method by which this object is achieved by the present invention were described at the outset.

It is surprisingly possible here, after curing the surface structure layer on one side of the base film to provide the other side of the base film with a further layer, likewise having a structural or 2-dimensional pattern, and to cure the latter through the surface structure layer on one side by radiation curing, to be precise while the surface structure layer on one side is still in engagement with the circumferential structure of the second roller, with the result that an absolutely in-register formation of the layer on the rear side of the base film is achieved, meeting the given tolerance of the film or layer produced.

The method further comprises using a film or a layer which has as a surface structure on one side a multiplicity of identical, parallel, elongate lenticular structures, in particular of cylindrically arched form, and is provided on the other side with mutually assigned parallel lines or grooves or ridges (or "bars") in register with said structures.

The film or the layer may also be formed with a multiplicity of parallel arcuate lenses as the surface structure.

The surface structure on the other side may also be formed by a multiplicity of parallel ridges, in particular of rectangular form.

It is expedient if the lenticular structure on one side and the parallel lines, grooves or ridges on the other side are produced after each other in time, in particular immediately after each other, and in register with each other.

The lenses and ridges may advantageously consist of a UV-curable polymer, in particular an acrylic resin. It is also possible, for reducing transparency, to add to the polymer, in particular the acrylic resin, pigment as a filler accounting for up to about 30% by weight.

It is likewise advantageous to provide the ridges with optically opacifying layers, in particular to print said layers on.

The number of such opacifying layers is at least two, preferably eight.

In any event, for applications of the film or layer produced for anti-copying purposes—the maximum transparency of the ridges should be about 7%. This ensures that the viewing-angle-dependent properties of the anti-copy film can be realized.

In order that the legibility of the document is ensured, the width of the ridges is chosen such that they cover, and consequently render opaque from an approximately perpendicular viewing direction, at most about 80% of the surface area of the film or of the layer.

In a preferred apparatus according to the invention there is a third roller, which is arranged downstream of the first two rollers, is driven equally fast and in the opposite direction to the second roller and is provided with a structural or 2-dimensional pattern on the circumference, a further layer being applied by means of a further application device to the other side of the base film, which has been coated and cured on one side, and is subsequently cured (on the other side) by means of a radiation source.

The second roller expediently has as the circumferential structure a multiplicity of identical parallel, elongate cylindrically lenticular grooves, in particular of cylindrically arched form. The grooves may also have an arcuate form in cross-section.

The third roller is expediently formed with a circumferential structure comprising a multiplicity of parallel grooves, in particular of rectangular form.

The grooves are produced very exactly and reproducibly.

The first roller is expediently produced with a smooth circumferential surface.

In practice, at the first roller there is provided a contact roller, by means of which the base film for the production of a film or a layer is fed to the circumference of the first roller.

The first roller may advantageously serve as a master drive roller for controlling the rotational speed of the first and third rollers, It is favorable in practice if the second roller is designed to be axially adjustable by means of an adjusting device, in particular on an eccentric basis, with respect to the first and third rollers. Similarly, the third roller may be designed to be axially adjustable with respect to the first and second rollers.

The adjusting device may, in a simple way, substantially comprise a thrust element which is connected to the axially adjustable roller and to which an eccentric shaft is fastened.

It is also favorable if the not respectively axially adjustable rollers are mounted by means of a swivelling away or drawing away de vice, for simple and fast threading in of the base film.

A swivelling mechanism, formed by an eccentric mounting, may be favorably used for this.

A coater with a coating gap may be used as the application device for the layer material, and a lifting-off device for the coater may likewise be provided for threading in the base film.

Furthermore, it is advantageous in practice if bearing means are used, in which two of the first to third rollers can be set with respect to the other (remaining) roller in their parellelism to the other (remaining) roller.

For driving each of the three rollers, a disc-armature motor with interposed gear transmission and a sychronism control may advantageously be provided.

It is very favorable if the application device is a curtain coater which has a housing with light shielding devices, the latter including elements made of PTFE.

Furthermore it is very favorable if the application device consists of fine feed regulation elements. These elements are piston housings with needles moving transverse the coating are of the roller.

In practice, a nip setting device may be provided for the first nip between the first and second rollers and a further nip setting device may be provided for the second nip between the second and third rollers.

An unwinding station for the base film is equipped with a compensating roller control and is arranged upstream of the production device for the film or the layer, in order to obtain a constant tape tension which can be set.

A further drive station with compensating roller control may be advantageously provided downstream of the production device in the running direction of the film or the layer, in order to be able to set another suitable tape tension.

Furthermore, if the ridges are to be provided with opacifying layers for reducing transparency, it is expedient to arrange a printing station, for printing onto the ridges on the rear side of the base film, downstream of the further drive station in the running direction of the film or the layer.

If desired, a station for applying an adhesive to the film or the layer may expediently also be provided downstream of the printing station.

DESCRIPTION OF THE PREFERRED EMBODIMENT

Figure 1:
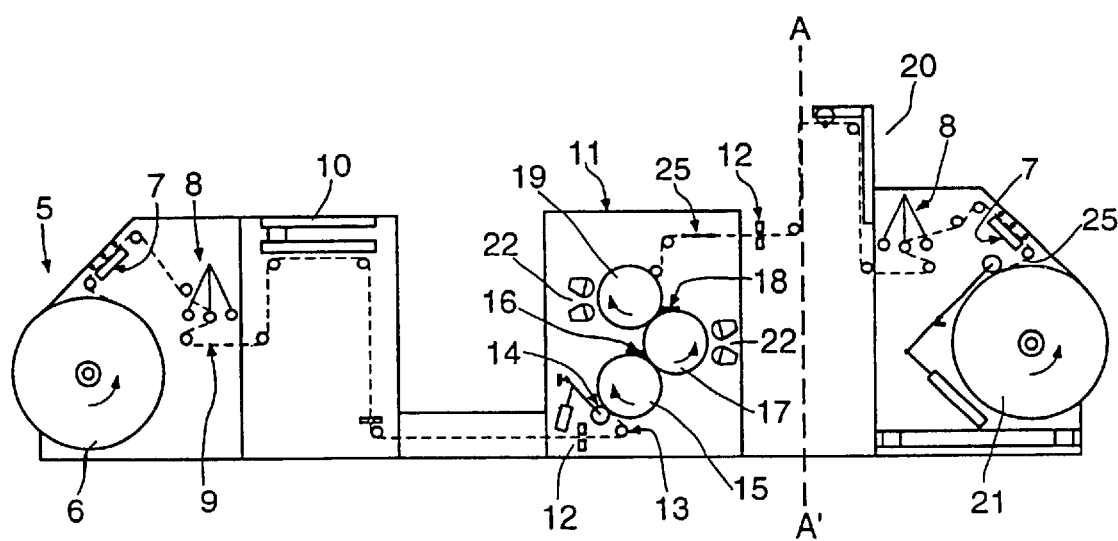
FIG. 1 shows a diagrammatic representation of the apparatus

An examplary embodiment of an apparatus according to the invention is now describe with reference to the drawings.

An unwinding station 5 comprises a film supply roll 6 and a cutting and pasting table 7 for cutting the film 9 and pasting on the beginning of a new roll. This is followed by a compensating roller control 8 for setting and maintaining a specific, as constant as possible tape tension in the film 9.

The lateral alignment of the running of the film 9 is performed by means of an edge control 10. Thereafter, the film enters the film or layer production device 11, passes a light barrier 12, is deflected by the deflection roller 13 and at a pressure roller 14, reaches the circumference of the smooth roller 15, which has a very planar and smooth circumference, and which leads the film 9 into the nip 16, which is provided between the smooth roller 15 and the neighboring roller 17, the latter having A circumferential structure, in particular a lenticular structure, and which is therefore to be referred to as the lenticular structure roller 17. From this nip 16, the coated film 9, which is to be referred to from now on as film 25, is led around the circumference of the lenticular structure roller 17 and passes into a further nip 18 between the lenticular structure roller 17 and a bar structure roller 19, which has a recessed or 2-dimensional bar structure on the circumference. After the film 25 has also been led around this roller circumference, it leaves the production device and passes via a further light barrier 12 into the rolling-up winding station 20, which in turn includes a compensating roller control 8 and a cutting and pasting table 7, as well as a film or layer winding-up roller 21. In the production device 11, radiation sources 22 are arranged at the circumference of the lenticular structure roller 17 and the bar structure roller 19.

Figure 2:
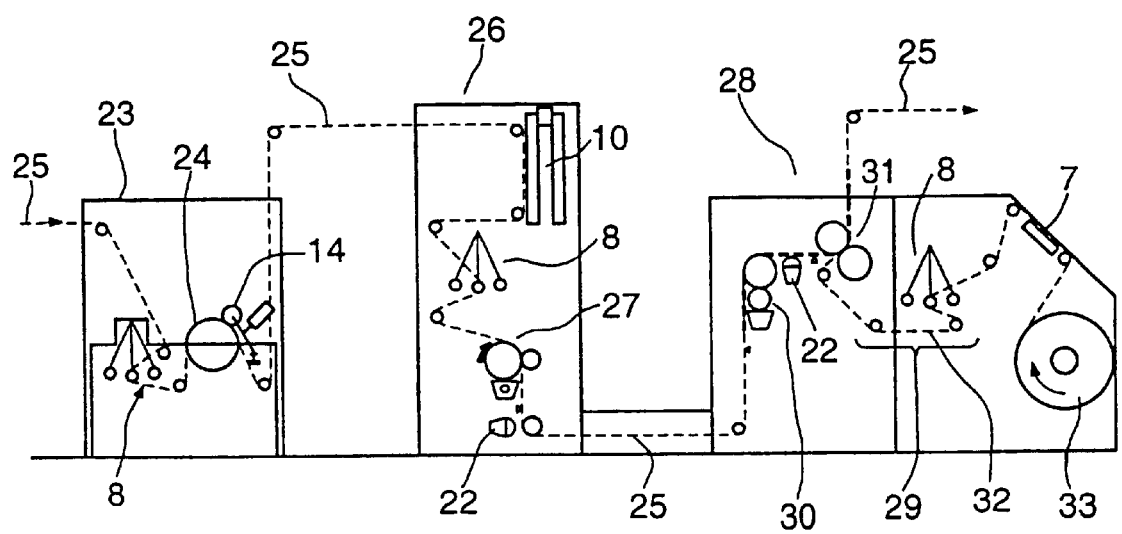
FIG. 2 shows an additional unit which can be fitted into the sectional lane A–A' of FIG. 1

Into the apparatus layout of FIG. 1 there may be fitted the following additional unit, represented in FIG. 2, at the sectional lane A-A'.

The film 25 arriving from the light barrier 12 enters a drive station 23, with compensating roller control 8 and a drive roller 24 with pressure roller 14. Thereafter, the film 25 reaches a printing station 26, which, apart from a printing unit 27, includes a radiation source 22, a compensating roller control 8 and an edge control 10. Thereafter, the printed film 25 reaches an adhering station 28, if appropriate with a laminating station 29, in which a screening film is applied to the adhesive layer of the film 25. The adhering station includes an adhesive application unit and a radiation source 22 and the laminating station 29 includes an application device 31 for the laminating material 32, which is fed from a supply roll 33 via a cutting and pasting device 7 and a compensating roller control 8.

Figure 3:
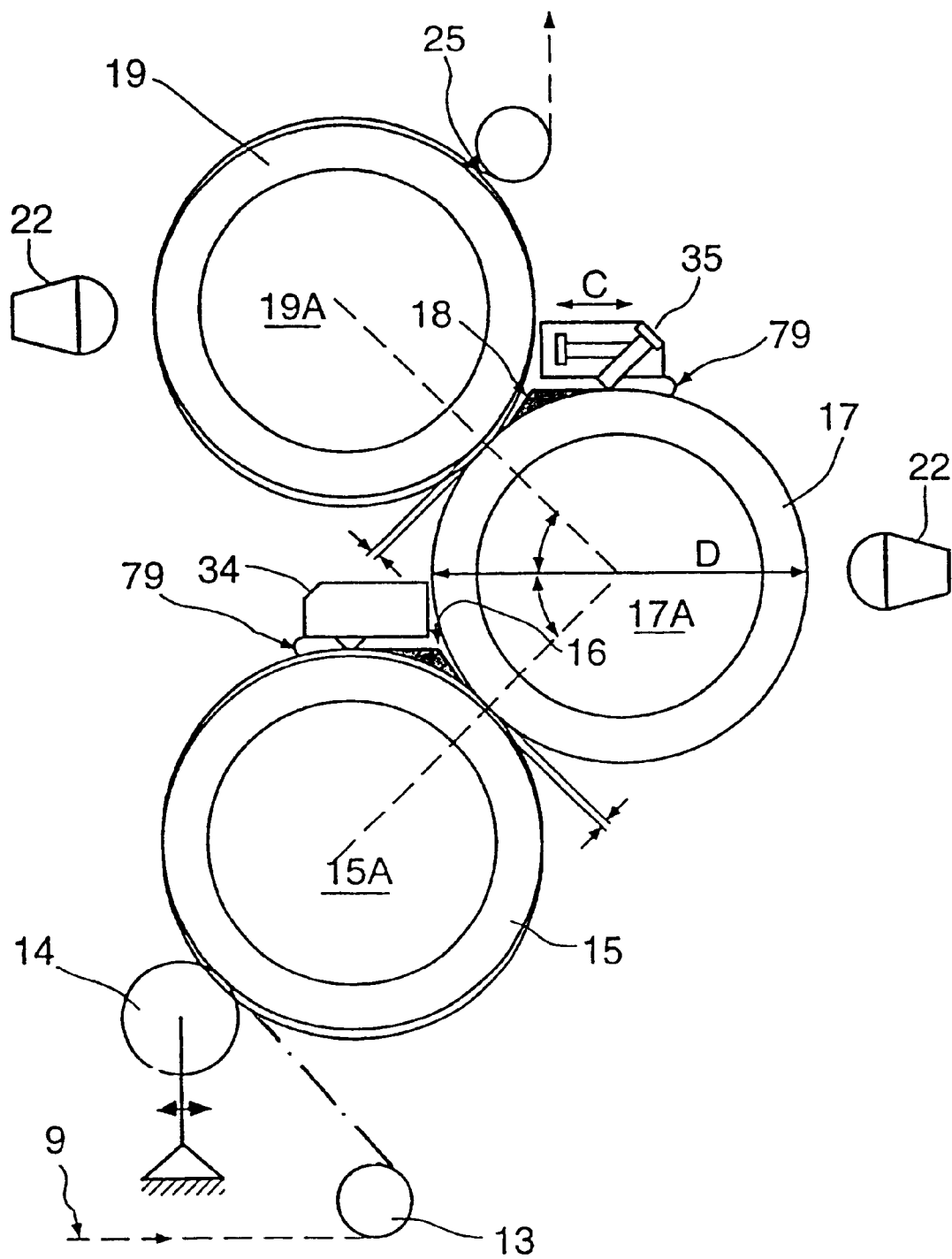
FIG. 3 shows the 3-roll arrangement of the apparatus on an enlarged scale

FIG. 3 shows the main apparatus, to be specific the three rollers: smooth roller 15, lenticular structure roller 17 and bar structure roller 19, illustrating more precisely their relative arrangement with respect to one another. The rollers 15 and 19 are arranged at the angle d of, for example 45° with respect to the horizontal diameter D of the roller 17. Provided upstream of the roller 15 are the deflection roller 13 and the pressure roller 14, which feed the film 9 to the roller 15. Indicated in the nips 16 and 18 are amounts of coating material as well as coaters 34 and 35, which, as application devices, apply the material to the film 9, and to the film 25, respectively. The coaters 34, 35 are expediently curtain coaters with light shielding devices 7, for example made of PTFE, if light-curing materials are used.

Radiation sources 22 are provided at the circumferences of the rollers 17 and 19.

It can also be seen at the rollers 15 and 19 that the nips 16 and 18 are adjust able by the amounts Δa or Δb, respectively, see the later explanation of the nip setting device. In general, Δa is virtually about equal to Δb and substantially corresponds to the thickness of the base film or the bas layer. Δa, Δb may also be chosen to be unequal to, ie. greater than, the film thickness, in order, for example, to increase the focusing distance.

It is also diagrammatically indicated that each of the rollers 15 to 19 also have their own drive motor 15A, 17A and 19A. Each of these motors 15A to 19A is equipped with an own gear transmission (not shown), has a very small moment of inertia and an own tachometer.

All the motors are coupled to one another via an electronic synchronism control.

In the case of the exemplary embodiment, the smooth roller 15 is expediently provided with the master function. That is to say that the motor 15A is the master drive unit, which dictates the speed of the machine and, in particular, the speeds of the other rollers 17 and 19.

Also important here is the compensating roller control 8, the compensating roller being coupled to a floating roller. Moreover, it is expedient to couple the unwinding and winding-up stations, and if appropriate the drive station 23 (after the film production device 11), to the master roller control.

It will be appreciated that the speed adaptation of the lenticular structure roller 17 and of the bar structure roller 19, respectively to the smooth roller 15 requires a particularly accurate matching of speeds, since the quality of the film is usually adversely affected by any difference in speed.

In principle, a high torsion resistance is necessary between the roller and the associated drive motor. The directly coupled gear transmissions and the tachometers, which supply the actual speed of the rollers, makes it possible to achieve very accurate synchronism control.

It is possible, for example, to set the lenticular structure roller 17 to 1% (per mil) faster than the master drive (roller 15, 5A), which causes a tension in the film 9. Thus, a desired tape tension between the rollers 15 to 19 can be set and kept constant. If, for example, the roller nip distance (a, b) (and consequently the effective roller diameter) changes, this can be compensated by a corresponding adaptation of the synchronism control.

For setting the roller nip 16 and 18 (nip widths Δa and Δb in FIG. 3), the master roller, smooth roller 15, and the bar structure roller 19 can be swivelled toward and away from each other by means of eccentric adjusting devices, as indicated in FIG. 3.

Figure 4:
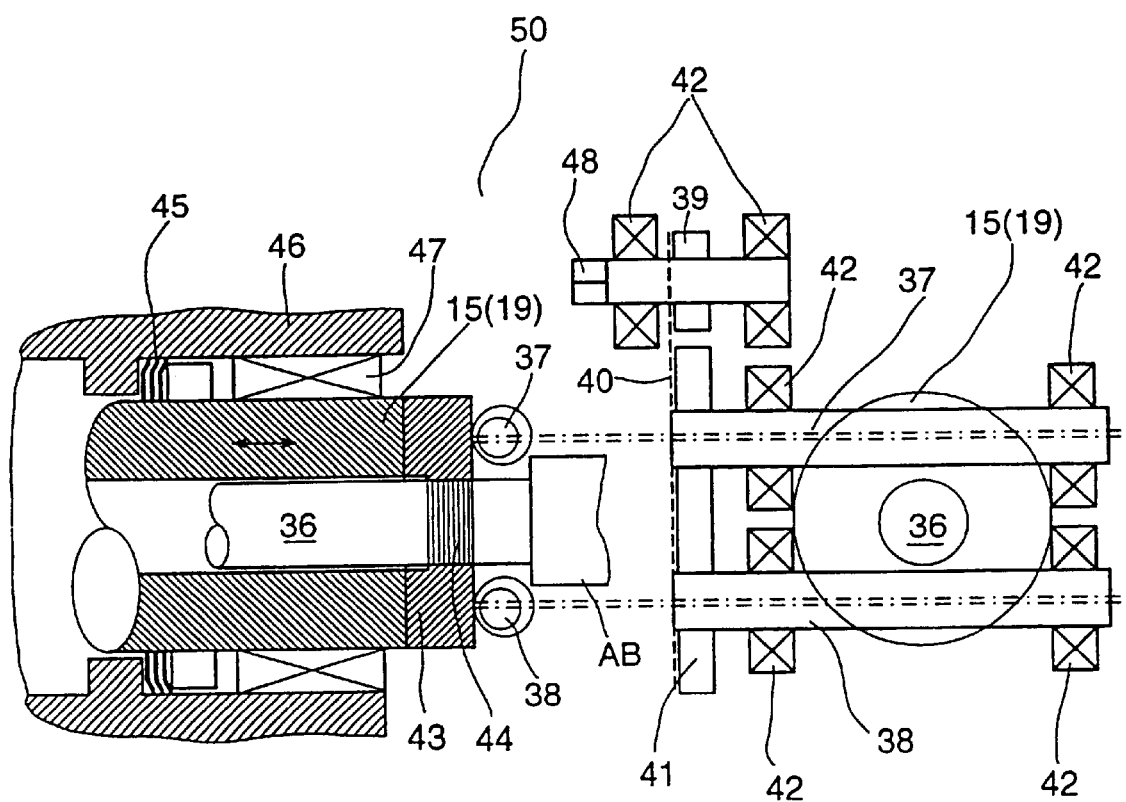
FIG. 4 shows an adjusting device for the axial adjustment of the rollers

A suitable eccentric adjusting device 50 is sketched diagrammatically in cross section and elevation in FIG. 4.

In this, 15, 19 denote in ross section and elevation the roller to be adjusted, 36 denotes the spindle of the roller, 37, 38 denote the eccentric shafts, 39–41 denote a combination of intermeshing gear wheels, 42 denotes various mountings of the eccentric shafts 37, 38 and gear wheels 39–41, AB denotes an axial drive, 43 denotes a pressure plate, 44 denotes a coupling, 45 denotes spring elements, 46 denotes a housing and 47 denotes axial guide elements. The gear wheel 39 can be turned by flaps 48, whereby the two gear wheels 40 and 41 and eccentric shaft 37, 38 are synchronously rotated, with the result that the eccentrics press against the pressure plate 43 and displace the latter axially in the directions of the double-headed arrow. The prestressing is provided by the spring elements 45. In this way, axial displacements of the order of 0 to 1 mm can be achieved with n accuracy of 1–2 μm.

For threading in and cleaning, the nip 16, 18 can be opened to 8 mm. By means of stop plates (not shown), which can be mounted on the lengthened roller spindle by means of thrust sleeves, an exact repetition accuracy is ensured. The swivelling itself of the rollers 15 and 19 toward and away from each other can be accomplished by means of suitable pneumatic cylinders, which also have the effect of compensating for tolerances.

Figure 5:
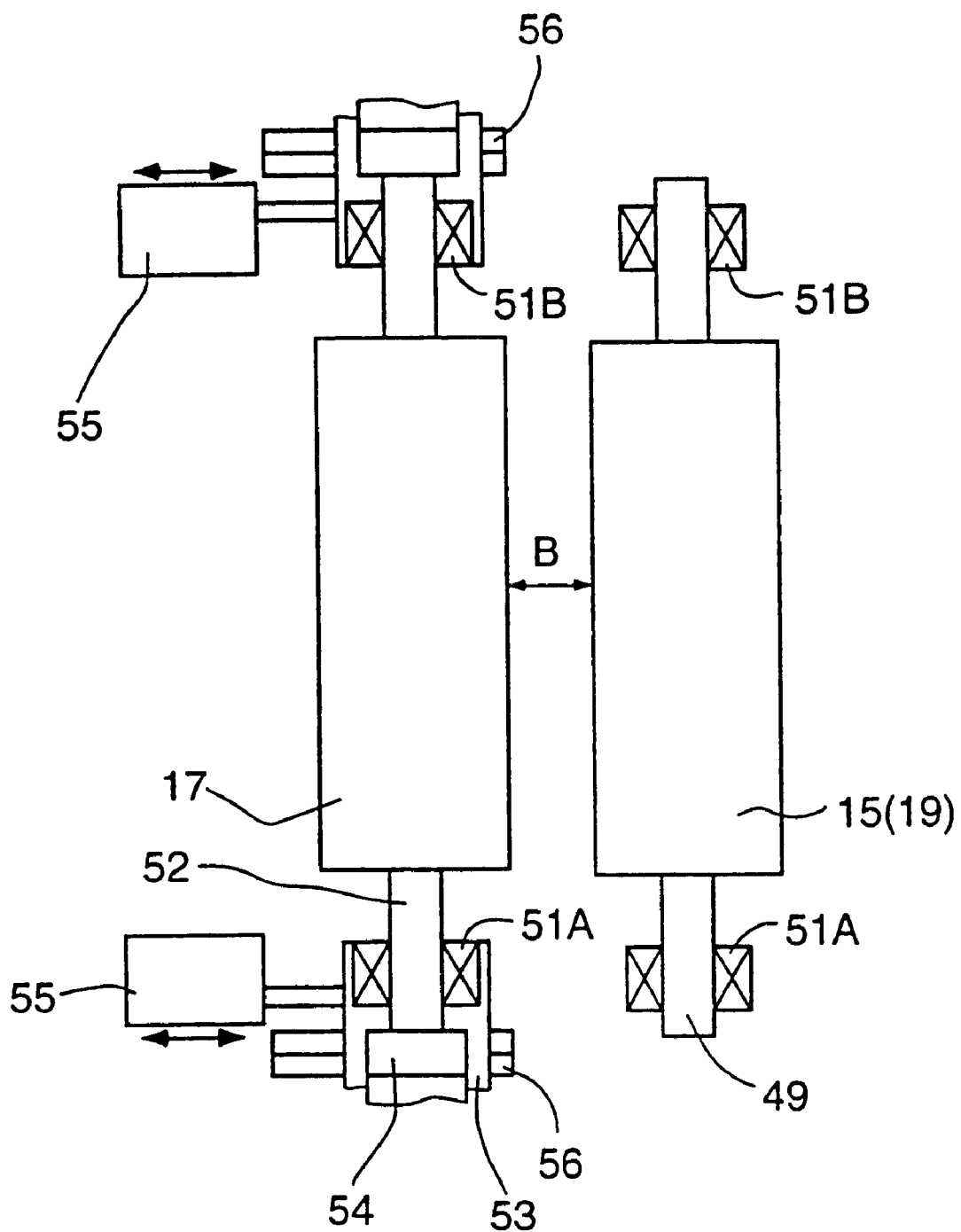
FIG. 5 shows a drawing off device of the not axially adjustable rollers

An alternative adjusting device 60 is represented in FIG. 5, on the basis of a drawing away of not axially adjustable rollers on a linear guide.

15 (19) denotes the fixed, thus here not adjustable, roller. Its spindle 49 is held in the rotary bearings 51A, B.

The other roller 17 which can be drawn away is likewise mounted by a spindle 52 in just such rotary bearings 51A. A housing 53, which apart from the rotary bearings 51A, B also contains suitable sliding or rolling elements 54, is connected to pneumatic cylinders 55. On actuation of the pneumatic cylinders 55, the sliding or rolling elements 54 move on linear guide rails 56 in the directions of the double-headed arrow B. The accuracy of about 1–2 μm an also be achieved here.

The coaters 34 and 35 are diagrammatically represented in FIG. 3, on the one hand by the external outline (34) and on the other hand (35) by a setting screw for setting the amount to be applied.

The entire coater 35, which of course extends over the entire width of the film 9, can be lifted off the roller 17, by means of swivelling toward and away device which is not show but is indicated by double-headed arrows C, for cleaning and threading in the film 9, and can subsequently be swivelled toward the roller again. The same also applies to the coater 34. The distance of the coater from the roller can be suitably set by means of screws.

Figure 6:
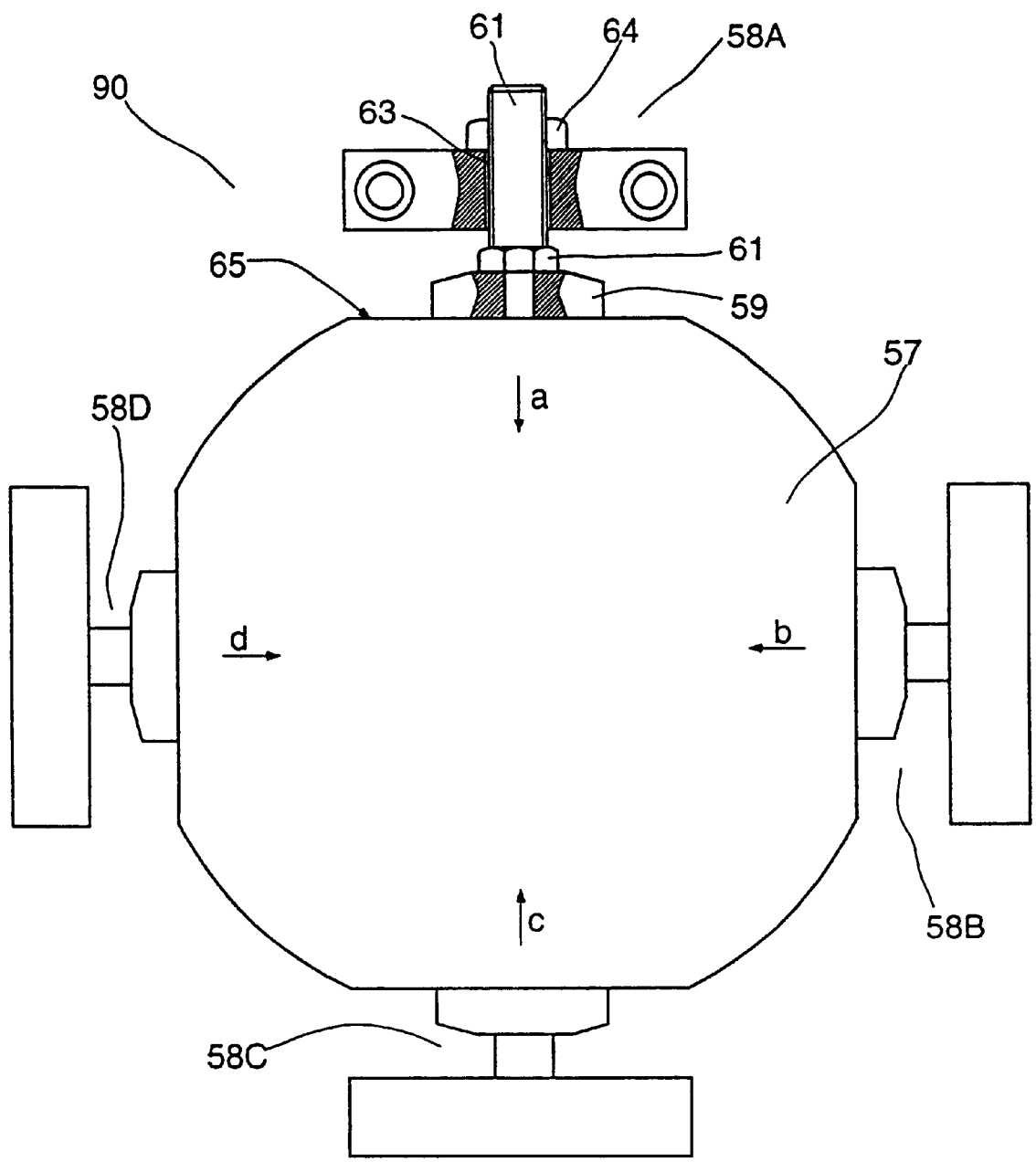
FIG. 6 shows a jack screw device for the roller adjustment in two planes

All three rollers, smooth roller 15, lenticular structure roller 17 and are structure roller 19, are respectively able to be set, on their side where the drive motor 15A, 17A, 19A is not present, in two planes for the axial parallelism with respect to one another. The setting must be performed accurately in the micrometer range—accurate to about 1 µm to about 2 µm—and is expediently realized by means of the following fine-setting bearing device 90 using jack screws, as shown in FIG. 6.

The bearing device 57 is mounted in a cruciform manner between 4 setting devices 58A–D. These respectively comprise a jack foot 59, a screw bolt 61, a holding means 62, a threaded bore 63 and a check nut 64. If the screw bolt is turned it the threaded bore 63, the bearing device 57 moves in the direction of longitudinal movement, in other words downward (arrow a) in the case of the upper setting device 58A and consequently upward in the case of 58C, to the left in the case of 58B and to the right in the case of 58D (see arrows b–d).

The jack foot 59 thereby presses on the bearing seat 65.

Figure 7:
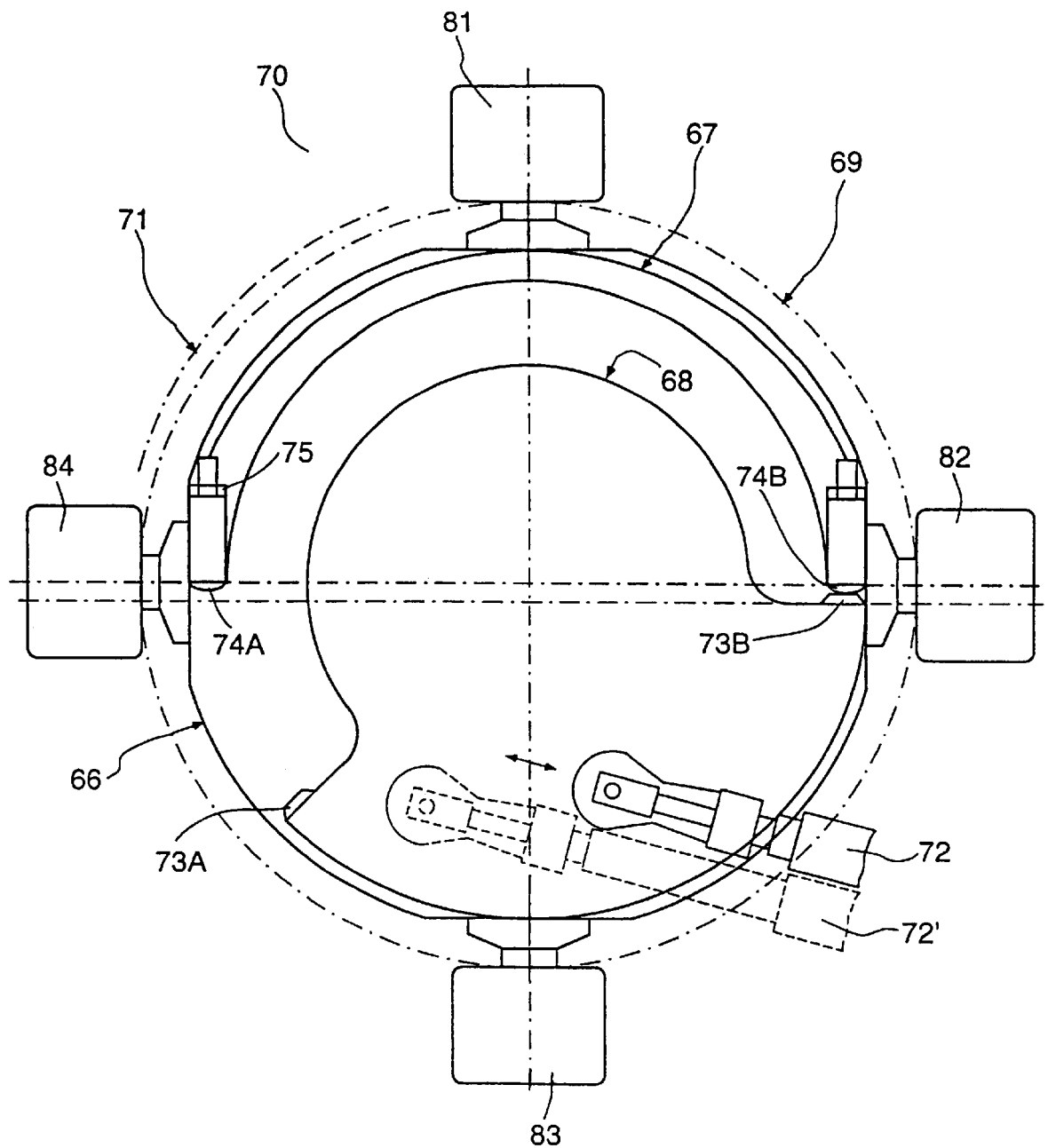
FIG. 7 shows an eccentric adjusting device for the roller nip

Apart from an eccentric adjusting device 50 in FIG. 4, an eccentric adjusting unit 70, represented in FIG. 7, can also be use for setting the roller nips 16 and 18 (FIG. 1).

The unit 70 comprises a stationary housing 66, to which a thrust sleeve 67 is fixedly screwed. A plate 68 is connected via the thrust sleeve 67 to the roller 15 (19), represented in the swivelled away position as a dash-dotted circle 69 and at the top left as a dash-dotted circle fragment 1, and is coupled to the lifting cylinder 72.

On the plate 68 are thrust bolts 73A and 73B, which interact with adjustable tops 74A and 74B. If the lifting cylinder 72 extends (in the direction of the lifting cylinder 72 indicated by dashed lines), the roller 15 (19) rotates to ether with the plate 68 in the clockwise direction, with the result that the roller is moved into its swivelled away position (circle segment 71), to be precise to such an extent that the thrust bolt 73A ears against the adjustable stop 74A. (The setting of the stop 74A, 74B can be fixed by means of the check nut 75.)

If the nip is then measure on the left-hand and right-hand side of the rollers by means of feeler gauges, the nip width can be corrected if there are any deviations by adjusting the stop 74A, 74B. The bearing means 81 to 84 may likewise be designed as axial parallelism precision setting devices, like the devices 58A–58D in FIG. 6.

The method to be carried out with the present apparatus substantially comprises first of all creating the lenticular structure by coating (for example by means of a curtain coating process), curing the lenticular structure by thermocuring or radiation curing and then, without the lenticular structure having left the structure roller (lenticular structure roller 17), coating the rear side of the film with a raised or 2-dimensional bar structure which is perpendicularly opposite the lenses an is in register with the lenticular structure, and curing said bar structure, in particular by the same coating and curing method and in particular using the same curable polymer materials.

The coating material, for example a photoresist material, for example ZM-2483R from Morton International Inc., USA or Craigcoat 1051X from Craig Adhesives al Coatings Co., USA, is metered in a coater which can be closed with respect to the at least one metering device. A film, in particular made of polyethyleneterephthalate PET) runs between the smooth roller 15 and the lenticular structure roller 17, wrapping around each through 180°, on over a third roller (bar structure roller 19), by means of which a rearside structure or a 2-dimensional pattern is applied to the rear side of the film. Both coaters are expediently of the same design. As indicated in FIG. 3, the coater 34, 35 comprises a vat with light shielding devices 79 made of polymer film material, in particular as a sealed termination with respect to the roller 17, 19.

Small nip distances are used during operation, ie. the smooth roller 15 is pressed only lightly against the lenticular structure roller 17, the photosensitive resin material, for example photoresist is released via the coater to the metering device and passes onto the film, is taken along by the latter and passes under the relief cavities of the circumferential structure of the roller 17 or else, if the roller 19 is designed as a structure roller, under the relief cavities of the roller 19. After a predetermined angle of roller wrap of about 130–170°, based on the 45° arrangement of the rollers 15 and 19 with respect to the roller 17, the resin material layer is dried by means of radiation through the transparent film. There may be a plurality of radiation sources 22, in order to obtain low residence times in the radiation region, in order that it is possible to operate at high film transporting speeds.

The nip setting devices 50 and 70 and also the axial parallelism setting bearing device 90 are examples of a technical configuration of such setting means in the range of about 1 to about 2 mm. Other equivalent and equally accurate means can also be used for these purposes.

In this application, reference is made at one and the same time to a film and a layer; this has the following meaning.

A film is always intended to mean a film which is provided at least on one side with a layer, as specified by the above method of application.

However, it is also possible in principle to produce a self-supporting layer by the method described by means of the apparatus describe and to cure it directly by means of radiation and then apply a further structural or 2-dimensional layer to it by means of the roller 19.

For the purposes of the present invention, radiation is taken to mean radiation generated by all electromagnetic sources, also including UV radiation, IR radiation and corpuscular radiation (for example electron beams). Suitable as materials for producing the layer of lenticular structure and the layer of bar structure are photoresist materials, known in the form of negative resists and positive resists.

These materials differ functionally in that the negative resist cures at the exposed locations and the positive resist becomes better soluble, in other words can be washed out, at the exposed locations. Negatively operating photoresists are generally based on photopolymerizable mixtures which, apart from a polymeric binder, contain a photopolymerizable compound with a photoinitiator. Such mixtures contain, for example, partially cyclized polyisoprene as the polymerizable compound and a diazide compound as the light sensitive bifunctional crosslinking agent (photoinitiator). Also known are partially cyclized polybutadiene as the polymerizable compound and diazides (see above).

Positively operating photoresists are conventional systems comprising a photoinsensitive alkaline-soluble matrix based on Novolak and a photosensitive component, which acts as a solubility inhibitor and is converted by exposure into alkaline-soluble products, with the result that the entire exposed regions are soluble in the alkaline developing solvent.

Also known as resists for the short-wave UV range are, for example, polymethylmethacrylate, copolymers of methylmethacrylate and indenone as well as of methylmethacrylate and 3-oximino-2-butanone as the photoactive component. Likewise known are two-component systems of a polymethylmethacrylatecomethacrylic acid matrix and o-nitrobenzylene esters, for example esters of cholic acid, as solubility inhibitors.

Suitable photoresist materials may be selected and used with advantage for the purpose of the invention, if appropriate using suitable transparent adhesives or adhesion promoters.

Other suitable resin materials with suitable photoinitiators can also be used for the purposes of the present invention. It is important here that the curing process proceeds in a relatively short time and that little or no subsequent work, ie. developing, drying etc., is necessary.

An anti-copy film produced by the method and the apparatus described above is explained below with reference to the representation in FIG. 8.

An anti-copy film 80 comprises in cross section (diagrammatically represented) a layer of lenses 76, a base film 77 and a layer of bars 78. The layer of lenses 76 comprises raise individual lenses U, which have, for example, a cylindrically arched form (L). The layer of bars comprises raised bars B, which have, for instance, a cuboidal form (rectangular form in cross section). Provided in between is the base film 77, which serves as a substrate for the layers 76 and 78 and is formed in the commercially usual way with a very uniform thickness and preferably consists of polyester, for example polyethyleneterephthalate (PET). The thickness tolerances of commercially available 100 $\mu$m films lie in the range of about +1 $\mu$m. In principle, films with a thickness of bout 10 $\mu$m to about 125 $\mu$m can be expediently used.

The layer of lenses 76 and the layer of bars 78 may be produced as embossed or coated layers from thermoplastic and thermocurable materials with the respective lens-arch or cuboidal structure. Because of the necessary register of each lens arch with each cuboidal bar, it is more favorable to produce firstly the lens-arch structure and then to produce the bars optically through the finished lens arches (in a way similar to in EP-B 655 032), best of all by a curing process by means of optical radiation.

It is advantageous firstly to produce the lens-arch structure, by using pourable polymers which are thermoplastic and radiation curable, for example photoresists such as acrylic resin, with additives curing by UV light, and subsequent curing, for example by means of UV or laser light, and to produce the cuboidal bar structure in enforced register with said lens arch structure with the same or similar radiation curing materials. Production may take place continuously in webs, in other words over correspondingly surface-structured rollers with extremely high accuracy.

Figure 8:
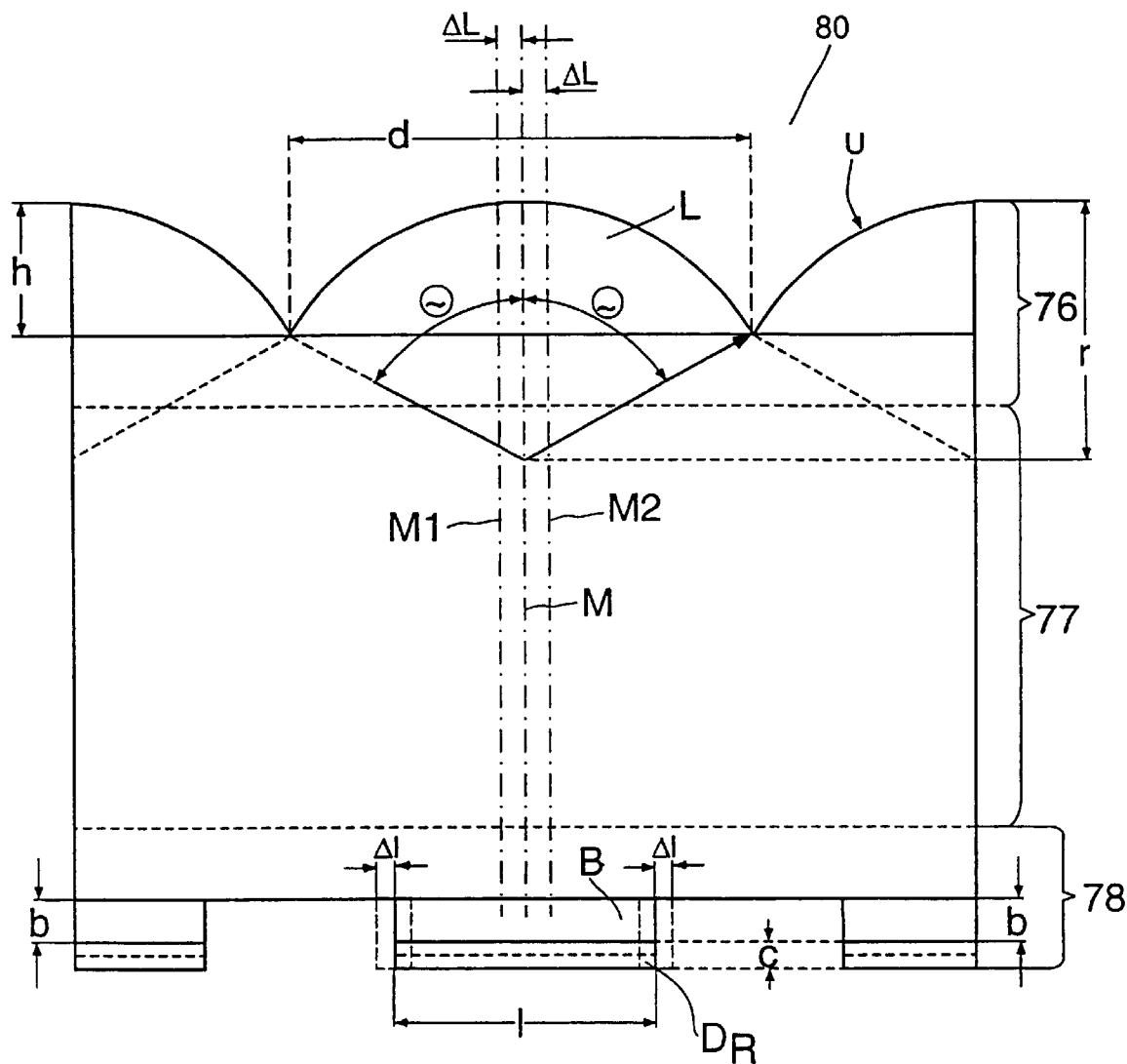
FIG. 8 shows a portion of an anti-copy film with cylindrically arched lenses and assigned bars with opacifying layers.

In FIG. 8, the middle lens arch L is provided with a center line M and has an aperture angle 2Θ of about 60°. The base length is denoted by d and is determined by the number of lens arches per unit of length, which may range from about 50 to about 800 lens arches per cm and in the example lies a round 100/cm. With the angle Θ and the length d/$_2$, the height h is obtained arithmetically.

The bars B are of approximately rectangular form in cross section and have a minimum thickness b of about 4 $\mu$m, without possible printed layers, and of preferably about 5 to about 10 $\mu$m with printed layers DR, which have twice the thickness c. The center line M of lens arch L and bar B symbolizes the ideal relative arrangement with respect to each other, which, however, cannot be achieved in practice. Therefore, the deviating center lines M1 and M2 have been drawn in alongside the line M to the right and left; the distance from M represents the symmetry tolerance deviation $\Delta$1, it being intended for $\Delta$1 to mean only the displacement of the bar B by the bar width 1 to the right or left, as shown by dashed lines. This symmetry tolerance deviation $\Delta$1 is to be, according to the invention, at most about ±15%, in particular about ±3 to about ±5%, of the bar width 1, if the properties of the anti-copy film are to be retained. The bar width 1 is to be chosen in principle such that at most about 80% of the surface area of the document not to be copied is screened, in order that it is still ensured that the document is legible for people in spite of the anti-copy film applied to it.

The anti-copy film described is designed for preventing copying by means of copiers with an aperture angle in the range from about 20' to about 50°, the aperture angle being the greatest aperture angle of the optical system of the respective copier.

Small aperture angles, that is more in the central region of the document, are not critical. The greatest aperture angles cover the edge region of the document and are therefore also critical in the sense of preventing copying. In practice, a photocopier of the Ricoh FT 5535 type, with a maximum aperture angle of about 44°, was taken as a basis for the example in FIG. 8.

In FIG. 8, a double printed layer DR has been applied to the bar thickness b, since it has been found to be advantageous to print two thinner layers one after the other rather than one thicker layer on its own.

This printed layer DR may be applied, for example, in the printing station 26 in FIG. 2.

The materials of the layers for the lens arches L and the bars B is in each case a material which is as transparent as possible (including after curing), as also in case of the base film 77, in order to utilize the optical properties of the film as well as possible.

The base film made of polyester has the advantages of being optically transparent, economical and dimensionally stable. Also coming into consideration would be, for example a polysulfone film, in particular because of its higher refractive index than polyester, but it is uneconomical because of its much higher costs. The greater refractive index allows a smaller bar width 1 with an unchanged aperture angle or a greater aperture angle of the copier with an unchanged bar width 1.

With a raised formation f the bars B as the coated layer, a minimum thickness of about 3 $\mu$m is necessary, as described above.

It is, however, quite conceivable to design the roller 19 as a printing roller and to form printed layers of about 0.5–1 $\mu$m thickness in bar form or in other forms, but in a fixed, geometrical and optical relative arrangement with respect to a layer of lenses on the other side of the film or the layer.

Such 2-dimensional format ions can be used in 3-D representations and other optical indicia, security markings, etc.

If actinic radiation source are used as light sources, it is of course favorable, as mentioned several times above, also to choose the printing inks and adhesive materials correspondingly, in order to be able to use the same radiation sources or all the application and curing or drying processes, in order to obtain an optimum production flow without great residence times.

The great advantage of the 3-roller contact method and the apparatus described is, in particular, that the film or the layer is taken along in contact with each pair of rollers at every point in time of the coating and of production.

The invention described relates to advantageous methods of and apparatuses for producing a transparent film or a transparent layer with a surface structure at least on one side and, on the other side, in register with said surface structure, structural or 2-dimensional pattern, which operate with at least two rotating rollers and layer application between them and curing of a structural layer. By means of a third rotating application roller, a further layer can be applied in register to the rear side of the structural layer and can be cured. The roller and roller nips can be set very accurately by suitable devices. The rotation of all the rollers is controlled by a master drive.

We claim:

1. A method of producing a composite film or layer with a first layer having a 3-dimensional surface structure at least on a first side of a base film and, on an other side of the base film, a second layer having a 3-dimensional structural or two-dimensional pattern, which pattern is in register with the surface structure of the first layer, said method comprising applying a layer of thermoplastic polymer to the base film fed to a second roller, provided with a circumferential structure, via a first roller, wherein the first and second rollers are driven in approximately equally fast, but opposite rotation, wherein the second roller contacts the polymer to provide the 3-dimensional surface structure on the polymer layer so as to provide the first layer, and in which method there is a third roller, which is arranged downstream of the second roller, and is driven approximately equally fast and in the opposite direction to the second roller and is likewise provided with a structural or 2-dimensional pattern, and applying a further layer of thermoplastic, radiation-curable polymer material to the other side of the base film, which has been fed to the third roller via the second roller and was already coated at least on the first side, wherein the third roller contacts the further polymer layer to provide the 3-dimensional structural or two-dimensional pattern on the further polymer layer so as to provide the second layer, and radiation curing the further polymer layer on the outer, other side of the base film.

2. a method as claimed in claim 1, in which said first layer has as the surface structure a multiplicity of identical, parallel, elongate lenticular structures and the second layer on the other side of the base film has mutually assigned parallel lines or grooves or ridges in register with said structures.

3. A method as claimed in claim 2, wherein the lenticular structures and the parallel lines, grooves or ridges are produced after each other in time and in register with each other.

4. A method as claimed in claim 2, wherein said lenticular structures and said ridges consist of a UV-curable polymer.

5. A method as claimed in claim 4, wherein said polymer contains up to 30% by weight of pigments for reducing transparency.

6. A method as claimed in claim 4, wherein the maximum transparency of said ridges is about 7%.

7. a method as claimed in claim 1, in which the first layer has as the surface structure a multiplicity of parallel arcuate lenses.

8. A method as claimed in claim 1, in which said second layer has a 3-dimensional structural pattern.

9. A method as claimed in claim 8, in which said second layer has a multiplicity of parallel ridges.

10. A method as claimed in claim 9, wherein said ridges are provided with at least two opacifying layers.

11. A method as claimed in claim 10, wherein said at least two optically opacifying layers are printed onto the ridges.

12. method as claimed in claim 9, wherein the width of said ridges is chosen such that said ridges cover and render opaque at most about 80% of the surface area of the composite film or layer.

13. A method as claimed in claim 1, wherein the radiation curing is achieved by irradiating through the first layer.

* * * * *